Patented Mar. 3, 1953

2,630,415

UNITED STATES PATENT OFFICE 2,630,415

THREE-COMPONENT COPOLYMERS OF DRYING OILS, CYCLOPENTADIENE, AND TERPENE HYDROCARBONS

Howard L. Gerhart, Milwaukee, Wis., assignor to Pittsburgh Plate Glass Company, Allegheny County, Pa., a corporation of Pennsylvania No Drawing. Application October 15, 1948, Serial No. 54,820

16 Claims. (Cl. 260—23.5)

The present invention relates to the preparation of a new class of resinous products and it has particular relation to the preparation of resins comprising conjointing polymerization products of cyclopentadiene or its lower polymers, a terpene hydrocarbon and a glyceride oil.

One object of the invention is to provide a resinous product which is relatively soluble in various solvents employed in the paint and varnish industry and which otherwise is suitable for formation of films upon the surfaces of bodies which it may be desired to coat.

A second object of the invention is to provide a copolymer product possessing high degree of solubility in drying oils.

A third object of the invention is to provide a copolymer product having good wetting characteristics for pigments such as titanium dioxide, carbon black and others.

These and other objects of the invention will be apparent from consideration of the following specification and appended claims.

In an application to Howard L. Gerhart, Serial No. 324,392, now Patent No. 2,398,889, there are disclosed a series of resins obtained by conjointing polymerizing cyclopentadiene and various glyceride oils such as linseed oil, soybean oil, corn oil, castor oil and the like. The conjoint polymers are soluble in oil and compatible with many plastic compositions. They are characterized by air-drying properties of an especially high degree. For example, even by use of a glyceride oil of comparatively low drying properties in the preparation of the copolymer, it is possible to obtain a liquid film forming ingredient having air-drying properties sufficiently great to render the product valuable as a substitute for oils of high drying power. Thus, it is possible to obtain a linseed oil substitute from soybean oil. Linseed oil will yield a substitute for tung oil or china wood oil.

The present invention is based upon the discovery that various terpenic bodies and notably the cyclic terpenes and the alcohols derived therefrom can also be copolymerized with cyclopentadiene or the lower polymers thereof and glyceride oil to provide products which are highly useful in the art.

It is also contemplated to form copolymers of the terpenic bodies and cyclopentadiene and then to cook these with a glyceride oil to provide a modified oil of value for certain purposes.

It is further contemplated to provide copolymers of cyclopentadiene or dicyclopentadiene and the drying glyceride oil and then subsequently to cook the resultant copolymer with a cyclic terpenic body to provide further valuable materials.

In the preparation of the improved copolymer products in accordance with the provisions of the present invention, a substantial range of different components and conditions of operation is contemplated.

THE OIL COMPONENT

In the selection of a glyceride oil suitable for use in the practice of the invention a large variety is available. The oils for example include linseed oil and soya oil which are among the more important oils employed in the paint and varnish industry. For some purposes, cottonseed oil, oiticica oil and tung oil by themselves or admixed with a certain amount, e. g. 10 to 90% of linseed or soybean oils are contemplated for use as the oil component of the mixture. The use of fractionated unsaturated oil such as linseed oil or soybean oil as obtained by such processes as disclosed in Freeman Patent No. 2,200,391 or No. 2,200,390 are also within the scope of the invention.

The proportion of the oil component with respect to the cyclopentadiene or its lower homopolymers and the terpenic bodies is susceptible of wide variation. For example, the combination of cyclopentadiene or lower homopolymer and the terpenic body may constitute as little as 5% or thereabouts of the oil-cyclopentadiene-terpene mixture. As the proportion of oil is increased, the bodies of course tend to resemble more and more the oil from which they are derived, though so long as there is a substantial amount of the other two components of the mixture present, the oils have increased drying powers as compared with the unmodified oil. As the proportion of cyclopentadiene or dicyclopentadiene and terpenic body with respect to the oil component is increased, the products increase in viscosity and may ultimately assume a state of solid resins which are soluble in oils such as linseed oil or soybean oil and which therefore may be cooked into additional oil as a gum or resin. Amounts of as little as 30% of oil in the oil-cyclopentadiene-terpene mixture are contemplated.

THE CYCLOPENTADIENE COMPONENT

As the second component of the copolymer, cyclopentadiene may be employed though for economical reasons it is usually preferable to employ its dimer which under the conditions of reaction is found to undergo cracking to form the monomer which then undergoes copolymerization in situ. The use of some of the lower homopolymers of cyclopentadiene such as tricyclopentadiene or tetracyclopentadiene which under appropriate conditions can undergo cracking to form the monomer is also contemplated. The term "cyclopentadiene," therefore, is generic to its lower polymers. The proportion of the cyclopentadiene as will be apparent from the discussion of the proportioning of the oil, is susceptible of considerable variation. Usually the cyclopentadiene or its lower polymers will exceed in amount by weight the amount of the terpenic body employed in the process. Usually, at least three parts of cyclopentadiene to two parts of the terpenic body is near the upper limit of terpenic body. Obviously, there is no definite upper limit of the proportion of the dicyclopentadiene, since it will be recognized that cyclopentadiene or dimer thereof in the complete absence of terpenic body is still susceptible of copolymerization with unsaturated glyceride oils to form useful products as described in the above mentioned patent to Howard L. Gerhart. A lower limit of about 4 or 5% with respect to the cyclopentadiene-terpene mixture is contemplated as a practical proportion for the terpenic body. If the proportion is much reduced below this value, the effects of the terpenic body upon the product appear gradually to fade out so that the resultant product is practically the same as the two-component copolymer of the oil and cyclopentadiene or dimer of cyclopentadiene.

THE TERPENIC BODY

The use of various terpenic bodies in the preparation of the product is contemplated but particular emphasis is placed upon the cyclic terpenic bodies. These include dipentene, terpenolene, limonene, pseudo limonene, camphene and bornylene. The use of turpentine and pine oil which are composed largely of terpenic bodies such as alpha terpineol, pinene and the like is also contemplated. The terpenic body will be proportioned with respect to the other components of the mixture as above described.

APPARATUS FOR USE IN THE PREPARATION OF THE PRODUCTS

In the preparation of the copolymer products as herein described, any embodiment of apparatus suitable for preparing the two-component copolymers of glyceride drying oils and cyclopentadiene or dicyclopentadiene may be employed. An autoclave is quite appropriate for the purposes. The reaction components can be introduced into such container and heated up to reaction temperature, the pressures within the autoclave being allowed to rise as the exothermic reaction proceeds. It is also contemplated to employ continuous coils of pipe through which the reactants may be slowly pumped to provide a copolymer which is drawn off as a liquid. It is further contemplated to introduce cyclopentadiene or dicyclopentadiene into oil in an appropriate container such as a kettle or pot or other vessel which preferably is provided with a reflux condenser designed to return any vaporized products such as cyclopentadiene monomer to the reaction vessel. In this process, the cyclopentadiene or dimer thereof, along with the terpenic body, may be fed gradually into the reaction mixture at such rate as will prevent the excessive evolution of gaseous products or vaporization of the reactants. The reactants preferably are maintained under agitation by appropriate devices while they are in the reaction zone.

REACTION TEMPERATURES WITHIN THE SYSTEM

Any reaction temperature sufficient to maintain cyclopentadiene in its monomeric state in the reaction zone is contemplated. Usually the temperature will be above 200° C. and preferably at least during the later stages of the reaction, it will go higher for example to 250 to 300° C. The temperature should not be so high as to induce charring or even excessive darkening or decomposition of the reactants or the reaction products. If the mixture is subjected to high temperature for but brief periods of time, the temperature may be higher than where prolonged heating occurs.

THE REACTION PRESSURE

If an autoclave is employed as a reactor, the pressure may be that generated by vaporization or cracking of the reactants. Additional mechanical pressure can be applied but it is not required. It drops as the reaction reaches conclusion.

CATALYSTS OF POLYMERIZATION

Catalysts of polymerization, such as salts of heavy metals could be added but are not necessary since the reaction can be completed without them.

THE TIME OF REACTION

The reaction time like the other factors is susceptible of much variation dependent upon the temperature of reaction, the viscosity desired in the finished product and other factors. For many purposes, products of only low viscosity are desired in which instance the reaction may not be carried to such extreme degree of completion as is required for the more viscuous products. It is usually desirable to continue the reaction until a body of D, E, or F upon the Gardner-Holdt scale is attained when the product is admixed with 50% of naphtha of VMP grade. Of course, the viscosities may be carried much higher, e. g. to a value of Z or even above if extremely viscous products are desired.

It will be understood that this viscosity constitutes one convenient criterion of the completion of the reaction to the desired degree. The viscosity is usually determined by drawing off samples from time to time from the reaction zone and subjecting them to the conventional viscosity tests. Other criteria of the completion of the reaction would be tendency of the reaction pressure to drop as the vaporizable components are used up in the reaction. This is easily observed in a pressure apparatus such as an autoclave by appropriate gauges. Where the reaction is conducted under a condenser, the cessation of the refluxing of condensable components constitutes another criterion.

For most purposes, the reaction can be carried sufficiently far within a period of two to sixteen hours. Somewhat longer periods are permissible but as the time of reaction is increased, the products tend to darken which for some applications may be objectionable. As the proportion of the terpenic body is decreased the time of reaction is substantially reduced.

The various factors involved in the preparation of applicant's product may be summarized substantially as follows:

Table A

Proportion of unsaturated glyceride oil. 30 to 95%.
Proportion of cyclopentadiene or polymer with respect to terpenic body plus cyclopentadiene. 50 to 96%.
Proportion of cyclopentadiene plus terpenic body to oil. 5 to 70%.
Temperature of reaction___ 200 to 300° C.
Time of reaction_____ About 2 to 16 hours.

The application of the principles of the invention in the preparation of copolymer resins of glyceride drying oils, cyclopentadiene or dicyclopentadiene and terpenic bodies of cyclic nature is illustrated by the following examples:

Example I

A mixture comprising:

5 parts linseed oil
1 part dipentene
3.9 parts dicyclopentadiene
A trace of nickel naphthenate was placed in an autoclave and heated to a temperature of 260° C. for a period of 7 hours. In this reaction the nickel naphthenate constituting a catalyst. It tended to increase the speed of reaction but it could be eliminated if so desired. There was obtained, as a result of the reaction in the autoclave, a copolymer of the three-resin components which was soluble in glyceride oils and in VMP naphtha. It was also a liquid product. The product with or without dilution could be spread as a film upon a surface and would rapidly dry to a hard, adherent state.

Example II

It is sometimes admissible to copolymerize dipentene and cyclopentadiene or dicyclopentadiene and to cook the resultant copolymer with additional glyceride oil such as linseed oil or soybean oil. In a specific example of such application 1 part of dipentene and 1.5 parts of dicyclopentadiene were copolymerized in an autoclave to form a hard gum. This gum could be dissolved in oil and the latter was heated to a temperature of about 200 to 300° C. to provide a good coating medium.

Examples illustrating the use of pine oil, which is largely alpha terpineol, an alcohol, are as follows:

In the preparation of the products, the oil employed was linseed oil but could be replaced by soybean oil or other oil. The hydrocarbon was dicyclopentadiene. The viscosity determinations were upon the product dissolved in an equal weight of petroleum naphtha of VMP grade. The reaction was conducted in an autoclave. The data of the tests are tabulated as follows:

TERPENE, CYCLOPENTADIENE, OIL COPOLYMERS

| Percent Oil | Percent Dicyclopentadiene | Percent Pine Oil | Bodying | | Viscosity Gardner-Holdt |
|---|---|---|---|---|---|
| | | | Temp., °F. | Time, Hrs. | |
| 58.6 | 36.6 | 4.8 | 505–525 | 5 | E |
| 55.8 | 35.0 | 9.2 | 515–525 | 5 | E |
| 47.5 | 29.5 | 23.0 | 525–540 | 16 | B |
| 60.4 | 37.6 | 2.0 | 505–525 | 3.3 | E |
| 58.6 | 36.6 | 4.8 | 505–525 | 5 | E |

The resultant products obtained as above described, were soluble in glyceride drying oil such as linseed oil and in paraffinic hydrocarbons such as naphtha. They were good film forming constituents when spread upon surfaces of the materials such as wood, metal or the like.

COATING COMPOSITIONS

The products when liquid, could be combined with additional oil, or if sufficiently fluid, could be employed directly in coating operations. In order to promote drying it was desirable to add to the compositions conventional siccatives of the paint and varnish art. These siccatives include the well known oil soluble salts of heavy metals such as the oleates, naphthenates or the like of the metals of groups seven and eight of the periodic arrangement of the elements, such as the salts of cobalt, nickel, chromium, lead, iron and the like are suitable. The driers may be employed for example in amounts of .001 to .5% of the vehicle content of the compositions.

Needless to say, non-reactive pigments such as titanium dioxide, basic lead carbonate, lithopone, lamp black and many others may be incorporated with the composition in the preparation of films.

Additional drying glyceride oil in any proportion e. g. 10 to 100% based upon the original copolymer can be added to the copolymer.

The forms of the invention herein disclosed are to be considered merely as representative of the art. It will be apparent to those skilled in the art that numerous modifications may be made therein without departure from the spirit of the invention or the scope of the appended claims.

This application is a continuation-in-part of my copending applications, Serial Nos. 568,556 of December 16, 1944, and 470,093 of December 24, 1942.

I claim:

1. As a new composition of matter a copolymer consisting of an unsaturated glyceride oil, cyclopentadiene and a dipentene.

2. As a new composition of matter a copolymer consisting of an unsaturated glyceride oil, cyclopentadiene and pine oil.

3. As a new composition of matter, a copolymer consisting of 30 to 95% of a glyceride oil having drying properties and a mixture of cyclopentadiene and a cyclic terpene hydrocarbon.

4. The composition as defined in claim 5 in which the terpene constitutes 4 to 50% of the cyclopentadiene-terpene mixture.

5. A method of preparing copolymers consisting of drying glyceride oil, cyclopentadiene, cyclic terpenic bodies of a class consisting of cyclic terpenic hydrocarbons, and cyclic terpineol comprising heating a mixture thereof to a temperature of 200 to 300° C. for 2 to 16 hours.

6. As a coating composition, a solution of a drying glyceride oil and a copolymer consisting of a drying glyceride oil, cyclopentadiene and a cyclic terpenic hydrocarbon containing .001 to 0.5% of a soluble heavy metal salt which is a catalyst of drying in a drying glyceride oil.

7. As a coating composition a solution of a drying glyceride oil and a copolymer consisting of 30 to 95% of a drying glyceride oil, 5 to 70% of a mixture of cyclopentadiene and a terpene hydrocarbon, 50 to 96% of the mixture being cyclopentadiene, the solution containing .001 to .5% of a soluble heavy metal salt which is a catalyst of drying in a drying glyceride oil, said first mentioned drying glyceride oil constituting 10 to 100% upon the basis of the original copolymer.

8. As a new composition of matter, copolymer consisting of an unsaturated glyceride oil, cyclopentadiene and a compound of a class consisting of cyclic terpene hydrocarbons and terpineol.

9. A method of preparing copolymer of drying glyceride oil, dicyclopentadiene, and a terpenic body of a class consisting of a cyclic terpene hydrocarbons and terpineol which method comprises heating a mixture of the foregoing ingredients under super-atmospheric pressure and in the absence of catalysts of copolymerization to a temperature of 200 to 300° C. for a period of 2–16 hours.

10. As a new product, the copolymer consisting of 30 to 95% of an unsaturated glyceride oil, and 5 to 70% of a mixture of cyclopentadiene and a compound of a class consisting of a terpene hydrocarbon and terpineol, the cyclopentadiene constituting 50 to 96% of the mixture.

11. In a method of preparing a copolymer of a solution of 30 to 95% of a drying glyceride oil and a 5 to 70% of a mixture of dicyclopentadiene and a terpenic body of a class consisting of a terpene hydrocarbon and terpineol, of which 50 to 96% is dicyclopentadiene; the steps which comprise heating the solution to temperature of 200 to 300° C. under superatmospheric pressure for 2 to 16 hours.

12. The steps as defined in claim 11 in which the terpenic body is dipentene.

13. The steps as defined in claim 11 in which the terpenic body employed is terpineol.

14. The steps as defined in claim 11 in which the reaction is effected in the absence of catalysts.

15. In a method of preparing a copolymer of a solution of 30 to 95% of a drying glyceride oil and 5 to 70% of a mixture of cyclopentadiene and terpineol of which mixture 50 to 96% is dicyclopentadiene; the steps which comprise heating the solution in the absence of catalysts to a temperature of 200 to 300° C. under superatmospheric pressure for a period of 2 to 16 hours.

16. A copolymer of a mixture consisting of a glyceride drying oil, cyclopentadiene and a compound of a class consisting of a cyclic terpenolene and a terpene hydrocarbon.

HOWARD L. GERHART.

REFERENCES CITED

The following references are of record in the file of this patent:

UNITED STATES PATENTS

| Number | Name | Date |
|---|---|---|
| 2,235,447 | Bradley et al. | Mar. 18, 1941 |